United States Patent
Bucher et al.

(10) Patent No.: US 7,805,600 B2
(45) Date of Patent: Sep. 28, 2010

(54) COMPUTER-IMPLEMENTED SYSTEMS AND METHODS FOR MANAGING IMAGES

(75) Inventors: Christopher J. Bucher, Wake Forest, NC (US); Mark D. Filipowski, Raleigh, NC (US); Dennis J. Chase, Raleigh, NC (US); Dawn E. Hamel, Apex, NC (US); Kenneth R. Bulmer, Raleigh, NC (US); Rodney C. Dupree, Fuquay Varina, NC (US)

(73) Assignee: SAS institute Inc., Cary, NC (US)

( * ) Notice: Subject to any disclaimer, the term of this patent is extended or adjusted under 35 U.S.C. 154(b) by 947 days.

(21) Appl. No.: 11/501,272

(22) Filed: Aug. 9, 2006

(65) Prior Publication Data
US 2007/0057958 A1    Mar. 15, 2007

Related U.S. Application Data

(60) Provisional application No. 60/717,584, filed on Sep. 15, 2005.

(51) Int. Cl.
*G06F 15/177* (2006.01)
(52) U.S. Cl. .......................................... 713/2; 709/222
(58) Field of Classification Search ..................... 713/1, 713/2; 709/222
See application file for complete search history.

(56) References Cited

U.S. PATENT DOCUMENTS

| | | | |
|---|---|---|---|
| 5,819,292 A | 10/1998 | Hitz et al. |
| 5,963,962 A | 10/1999 | Hitz et al. |
| 6,289,356 B1 | 9/2001 | Hitz et al. |
| 6,721,764 B2 | 4/2004 | Hitz et al. |
| 6,880,002 B2 | 4/2005 | Hirschfeld et al. |
| 6,892,211 B2 | 5/2005 | Hitz et al. |
| 7,233,985 B2 | 6/2007 | Hahn et al. |
| 7,350,206 B2 * | 3/2008 | Singhal ...................... 717/176 |
| 7,516,206 B2 | 4/2009 | Henseler et al. |
| 2002/0083037 A1 | 6/2002 | Lewis et al. |
| 2002/0162100 A1 | 10/2002 | Liles et al. |
| 2003/0051021 A1 | 3/2003 | Hirschfeld et al. |
| 2003/0105810 A1 | 6/2003 | McCrory et al. |
| 2003/0177176 A1 | 9/2003 | Hirschfeld et al. |
| 2003/0192043 A1 | 10/2003 | Lin et al. |
| 2004/0019823 A1 | 1/2004 | Gere |
| 2004/0139125 A1 | 7/2004 | Strassburg et al. |
| 2005/0193265 A1 | 9/2005 | Lin et al. |

* cited by examiner

*Primary Examiner*—Albert Wang
(74) *Attorney, Agent, or Firm*—Jones Day

(57) ABSTRACT

Computer-implemented systems and methods for handling requests to execute software applications. A system and method can be configured to include a set of pointers that are created for both referencing data associated with the requested software application's associated image and data associated with changes made during execution of the requested software application. A mapping is generated to indicate with which physical computer processing unit the created set of pointers is associated.

24 Claims, 11 Drawing Sheets

Fig. 11

COMPUTER-IMPLEMENTED SYSTEMS AND METHODS FOR MANAGING IMAGES

CROSS-REFERENCE TO RELATED APPLICATION

This application claims priority to and the benefit of U.S. Provisional Application Ser. No. 60/717,584, (entitled "Computer-Implemented Systems And Methods For Managing Images" and filed on Sep. 15, 2005), of which the entire disclosure (including any and all figures) is incorporated herein by reference.

TECHNICAL FIELD

This document relates generally to computer-implemented systems and methods for managing images and more particularly to computer-implemented systems and methods for scheduling access to software images that operate upon a computing device.

BACKGROUND

Different types of systems can be used to demonstrate, manage, train, and test software products. However, as software products continue to meet and exceed customer feature demands, software and product lines continue to grow larger and more complex, thereby creating numerous issues. These issues have manifested themselves in many different software-related areas. As a non-limiting example, it has become increasingly difficult to demonstrate and test products and create consistency across sales, internal and external training, publications, and research and development.

In order to support the sales process of a large-scale software product, many software companies have hundreds of people in almost all divisions around the entire world all doing the same thing—installing, configuring, and in some cases debugging the software for their niche with a customer. As products have increased their breadth and depth, product installation and configuration have required a substantial amount of time being taken away from staff core competency in order to address these issues.

One approach to address this issue could be to use a virtualization technology, such as VMware from VMware, Inc. with a location in Palo Alto, Calif. or Virtual PC from Microsoft Corp. with a location in Redmond, Wash. FIG. 1 depicts at 20 a possible configuration that includes a virtualization layer 22 provided by such systems. In the configuration 20 shown in FIG. 1, VMware could be placed on several physical hosts 24 using ISCSI or FCAL SAN which industry standard technology is available from many companies, such as Network Appliance, Inc. located in Sunnyvale, Calif. A salesperson/user in the field could wish to run one of the images 26. To do this, a user can request an environment and select an image to run. A software application can locate where the image is on a NetAPP storage unit 28 (which is available from Network Appliance, Inc. The software application finds an appropriate physical machine (i.e., host) that is available. The image is assigned to a physical machine and loaded. For example, image1 and image2 can be assigned to physical host3; image3 and image4 can be assigned to physical host1; image5 and image6 can be assigned to physical host2; and image7 and image8 can be assigned to physical host1. Note that an image that is loaded on a physical host includes a virtualization layer 22, such as a VMware software application. Although the virtualization layer 22 provides an insulated environment for an image to operate within a potentially heterogeneous environment (e.g., on top of a different operating system), this benefit is not without significant costs in overhead performance, additional monetary cost (e.g., for procuring the VMware software) and complexity (e.g., additional support from a software company's Information Services department).

SUMMARY

In accordance with the teachings provided herein, systems and methods for operation upon data processing devices are provided in order to overcome one or more of the aforementioned disadvantages and/or different disadvantages concerning the accessing of software applications. For example, a system and method are disclosed herein that contain a request to execute a software application. A set of pointers are created for both referencing data associated with the requested software application's associated image and data associated with changes made during execution of the requested software application. A mapping is generated to indicate with which physical computer processing unit the created set of pointers is associated.

BRIEF DESCRIPTION OF THE DRAWINGS

FIG. 11 is a graphical user interface for reserving an image.

DETAILED DESCRIPTION

Figure 1:
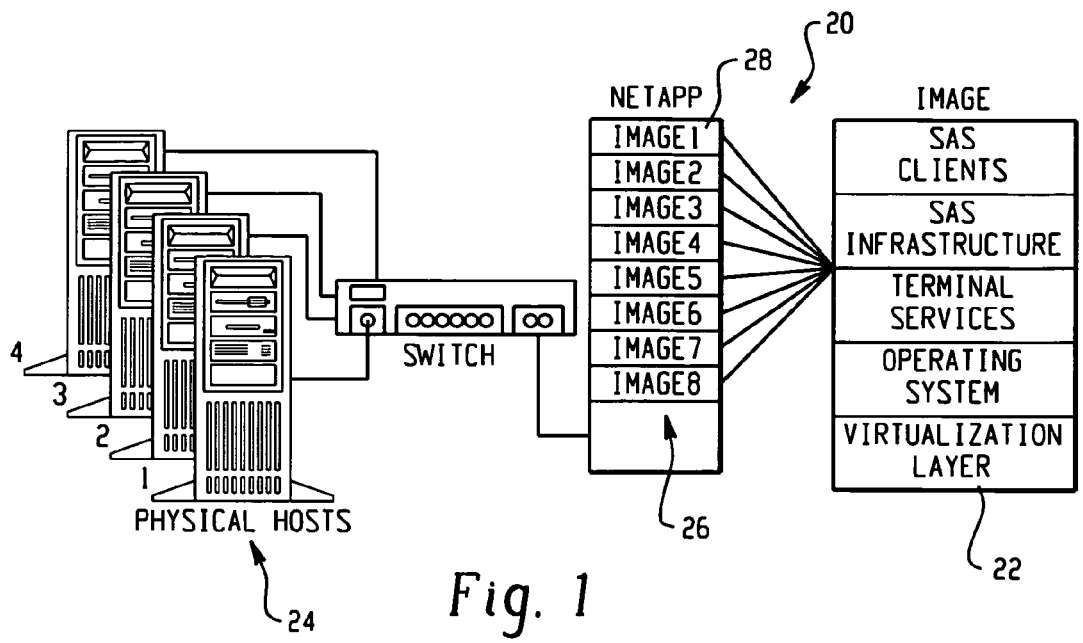
FIG. 1 is a block diagram depicting an image accessing system that includes a virtualization layer.
Figure 2:
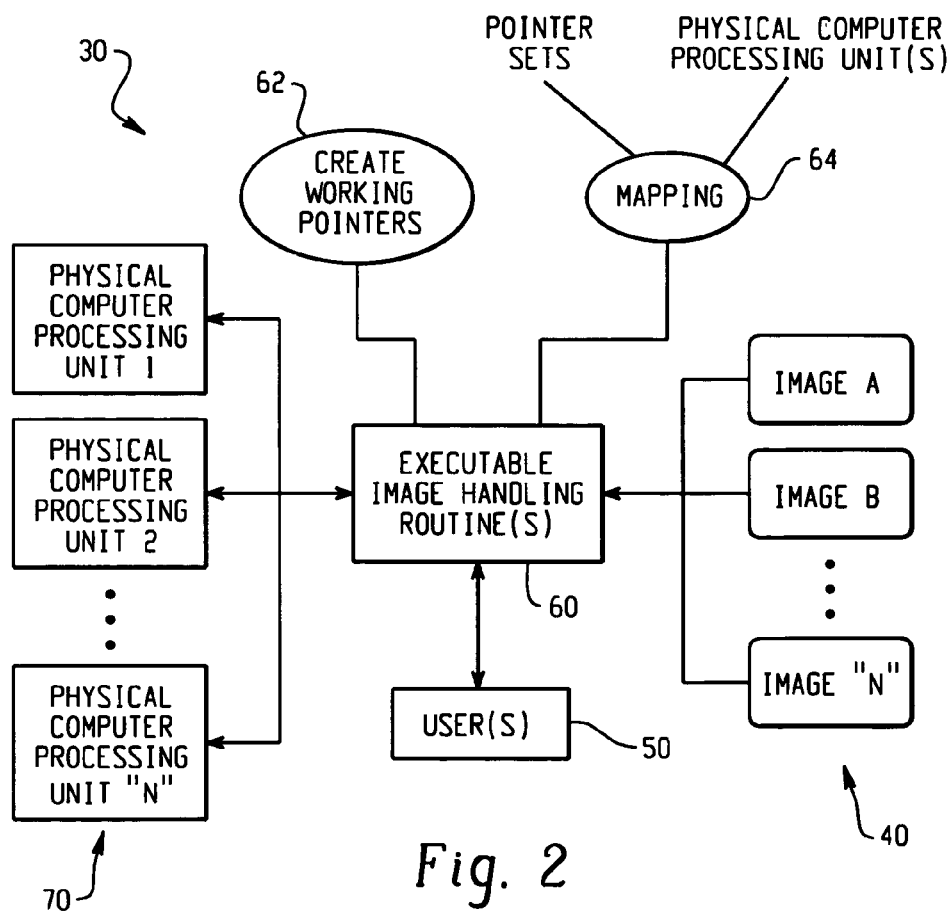
FIG. 2 is a block diagram depicting a computer-implemented system for managing the use of images.

FIG. 2 depicts a computer-implemented system 30 for managing the use of images 40. The system includes one or more software routines 60 for handling the access of the images 40. The software routines 60 can include input instructions that are configured to receive a request to execute a software application. The request may originally come from a user 50 or automatically from another software application. Pointer creation instructions 62 are used to create a set of pointers for both referencing data associated with the requested software application's image and data associated with changes made during execution of the software application. Mapping instructions 64 are used to store a mapping that indicates with which physical computer processing units 70 the created set of pointers is associated.

Figure 3:
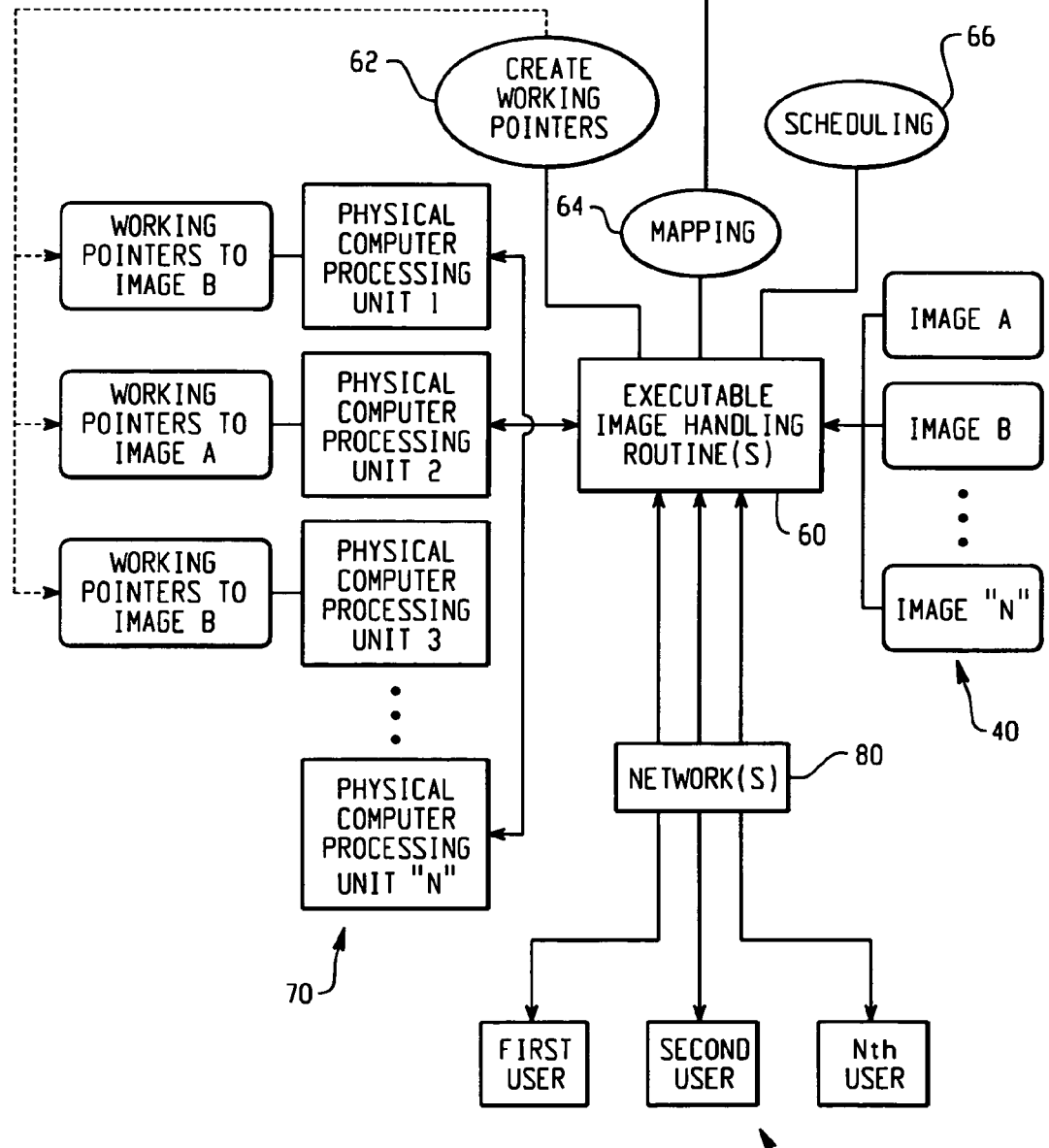
FIG. 3 is a block diagram of a computer-implemented system wherein multiple images can be assigned to one or more physical computer processing units.

As an illustration of the type of mapping that can be performed, FIG. 3 depicts multiple images 40 that could be assigned to one or more physical computer processing units 70. A physical computer processing unit is configured to run only one image at a time. In this example, a set of working pointers to image B are mapped to/associated with physical computer processing unit 1; a set of working pointers to image A are mapped to/associated with physical computer processing unit 2; and a set of working pointers to image B mapped to physical computer processing unit 3.

FIG. 3 also depicts that multiple users 50 can provide requests for access to software applications over network(s) 80. Many different types of network(s) 80 can utilized, such as a WANs, LANs, wireless networks, the Internet, and combinations thereof. For example in an Internet environment, a system could be configured to allow a user to access a web application, pick from a previously created list of images, and load and boot either a copy of or the image itself onto hardware dedicated to them in a process (which in some environments may not take long, such as only minutes). Once the image is booted, the user can logon to the machine using remote display technology to send the screen updates.

Software routines 60 could also include scheduling functionality/application 66 to manage the environment. Application 66 controls and coordinates the scheduling of software products and/or solution demonstration images that are mapped to, and booted from high performing physical computer processing units, such as blade servers. In one configuration, IBM Blade Centers can be used for the server "engine" and Network Appliance can be used for SAN disk space to store the images. These environments can then be remotely presented from either a company's internal location, a customer's site, or ultimately any location with an Internet connection and a browser (e.g., a windows PC). In this example, via a user interface, a systems engineer, trainer, or tester could go to select an image, schedule a blade server lease, and manage the images that run on that server. A user can put the current image on hold and select another image to run on their blade, and then choose to save these customized images to their own personal image library. In this example, the effect is that within a short amount of time (e.g., minutes), a user can be running a standardized image to do their work with no or minimal setup or configuration time.

Figure 4:
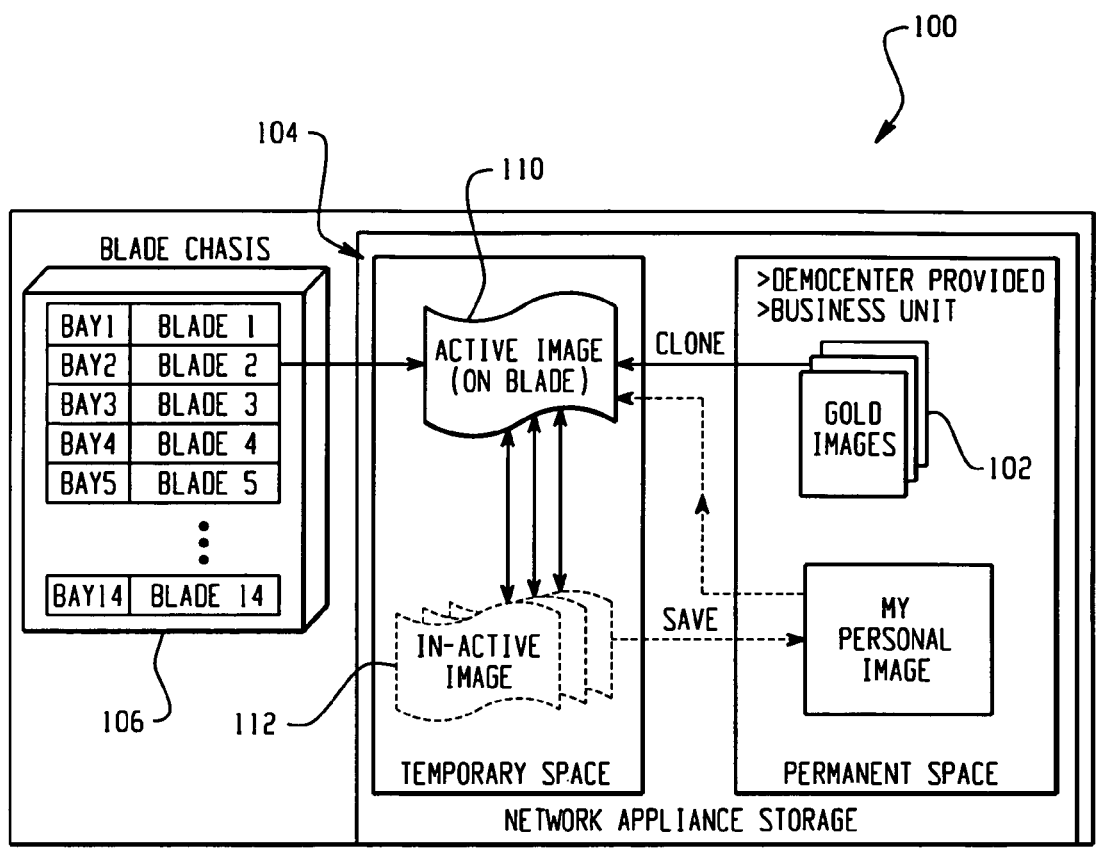
FIG. 4 is a block diagram of a system that can be configured to allow a user to schedule a physical server and have it preloaded with an image.

Such an approach may be configured in many different ways, such as in the manner shown in FIG. 4. With reference to FIG. 4, a system can be configured to allow a user to schedule a physical (non-virtualized) server and have it pre-loaded with an image (e.g., a SAS application Demo, training, or testing image). An image in this example represents the "C:" and "D:" drive of a server and contains the Windows operating system and SAS Software pre-installed. The configuration allows a user to map any image to any server which gives the user flexibility to schedule a server when the user needs it and have it pre-loaded with the SAS application Demo the user may want to give.

FIG. 4 depicts at 100 two types of images involved in an image loading process: permanent/gold images 102 and working images 104 (e.g., sets of pointers). A permanent/gold image does not get mapped to a server (e.g., a blade server or blade chassis 106). Its purpose is to be the "original" copy of an image (e.g., SAS Demo application). As an illustration, it holds the thirty Gigabytes worth of information that makes up the "C:" drive. To make use of a permanent image, a working version 110 is created based upon the permanent image. Working images 104 do not consume space until an entity (e.g., a user or a software application) starts to make changes on the server. Only the changes are saved to the working image, thereby not consuming thirty Gigabytes per machine that is in use.

Working images 104 can be active (e.g., image 100) or inactive (e.g., image 112). An active image (e.g., image 110) is one that is currently mapped to a server. Inactive (e.g., image 112) means that the image is not mapped.

A working image is mapped to a non-virtualized physical machine. After a working image is created from a permanent image (e.g., an original image), it can be assigned to a specific server. When this server is booted, it sees this working image as its C: drive and boots as if there is a local hard drive inside the machine. From this point the server behaves as any other server would.

Figure 5:
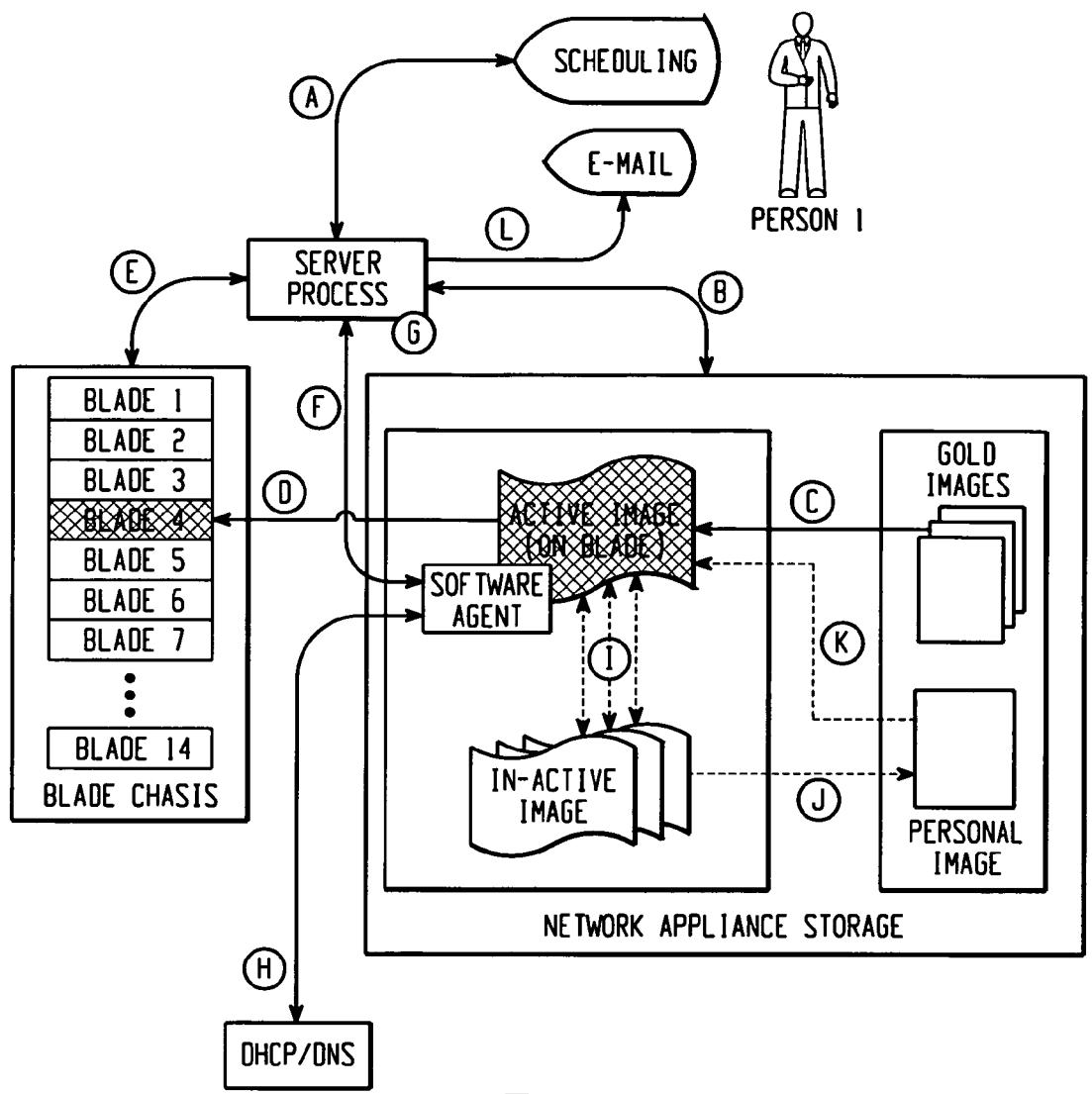
FIG. 5 is process flow diagram depicting an operational scenario for handling images.

FIG. 5 depicts an operational scenario for handling images. With reference to FIG. 5, a user schedules at step A a reservation for a server with a particular image to be loaded. At step B, when the reservation comes due, the system starts the reservation by first communicating with the NetAPP. At step C, an active working image (e.g., a clone) is created from an original image that the user picked in his/her reservation. At step D, that image is then mapped to the server that was reserved. At step E, the server is powered on. Upon booting, a software agent at step F within the image begins executing and communicates back that the server has booted and registers its IP address in a database. At step G, user accounts are created on the image. At step H, the server process then creates a DNS name for the IP address so that a user can use a name instead of an IP Address to access the server. At step L, the user is sent email instructing them that their server is ready. It also provides the userid and password along with the IP Address and DNS name.

At step I, if the user ends the reservation or unloads an image, the active working image becomes an inactive image (i.e., not mapped to a server). At step J, the inactive image can be saved to a personal image (i.e., becomes another "original" image). At step K, the user is allowed to reload this image or use it in future reservations. When this happens a new "Active" image is created from the personal image.

Figure 6:
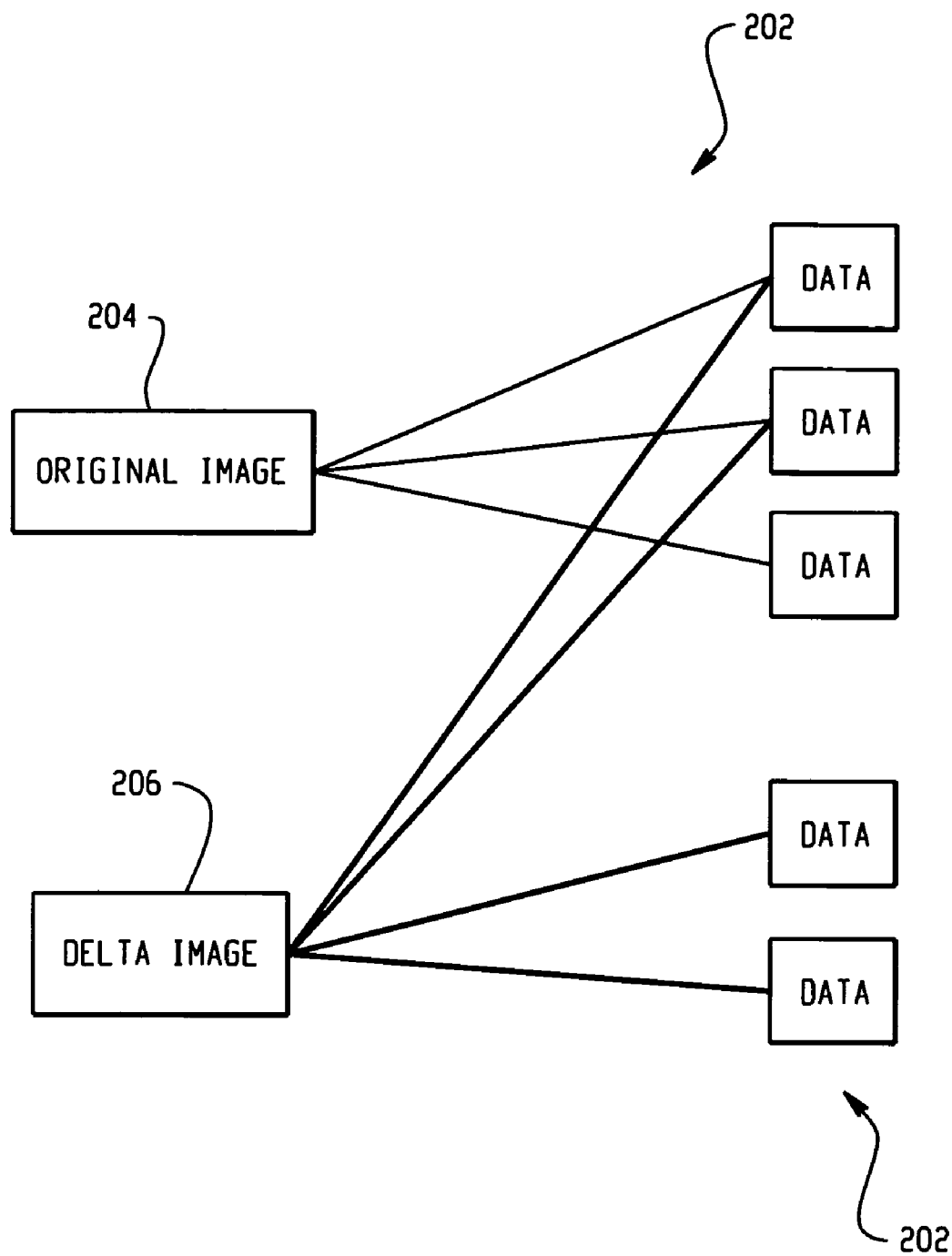
FIG. 6 is a block diagram wherein pointers are used for handling images.

FIG. 6 depicts at 200 an approach for how images can be stored on a system, such as in a NetAPP system. The data blocks 202 represent pieces of an image written to disk (similar to sectors). The original image 204 contains a list of pointers to the data blocks that make it up. The delta image 206 (e.g., a working image that has been cloned from the original) contains a list of pointers that may contain none, one or more, or all of the same pointers as the original plus a list of pointers to new data that was written as the image changed. New data can be pieces that replace pieces from the original or it can be new data added to the image. For example, a user updating a SAS dataset may cause one or more new data blocks to get written. The delta image 206 removes the pointers to the old data blocks that are no longer valid and creates new pointers to the newly written data. The original data blocks are not deleted because the original image still references them.

Figure 7:
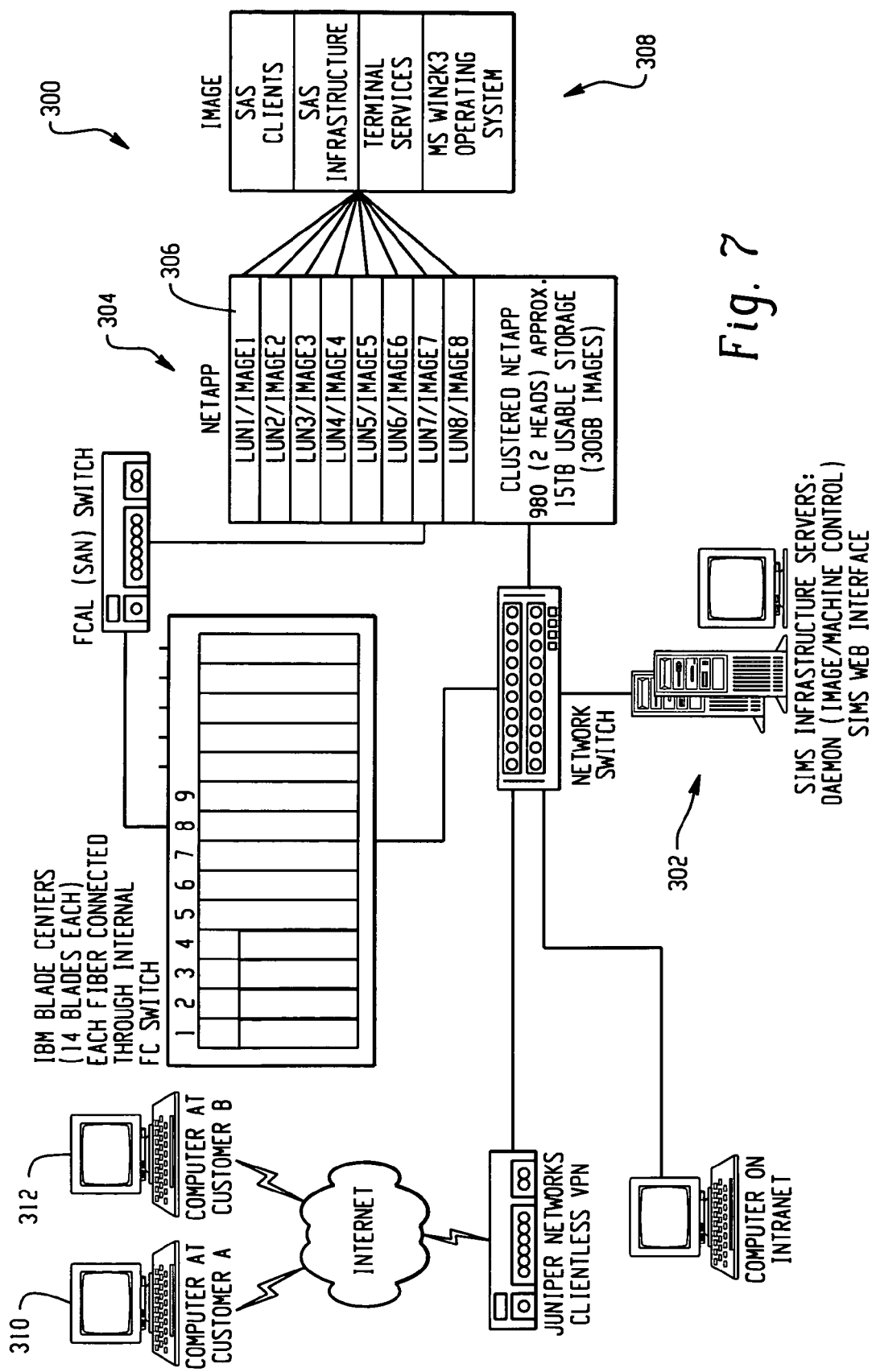
FIG. 7 is a block diagram a computer configuration for handling images.

The systems and methods disclosed herein may be configured in other ways, such as in a demonstration environment shown in FIG. 7. With reference to FIG. 7, a system 300 can contain many servers (e.g., two hundred blade servers in the data center that a user can reserve). An example of a server is shown at 302. A blade chassis is a housing for a number of individual computer motherboard "blades." Each blade includes one or more processors, computer memory, computer storage, and computer network connections, but sharing the common power supply and air-cooling resources of the chassis. By placing many blades in a single chassis, systems can be more compact and powerful, but less expensive than traditional systems based on mainframes, or server farms of individual computers. Blade servers can be used for specific purposes such as web hosting and cluster computing. Individual blades are typically hot-swappable. A blade server allows the use of a single reliable heavy-duty DC power supply, rather than many small and unreliable power supplies.

In the configuration of FIG. 7, the servers do not have system drives in them. Instead a system with access to a Network Appliance 304 to provide them with a "virtual" drive (e.g., a C: drive and possibly more), thereby providing an ability to quickly trade in and out C drives programmatically for each of these servers.

An image (e.g., image1 at 306) represents items that a user would find on a C: drive of the user's computer (e.g., an operating system, all of the software, including SAS products, user accounts, etc). Within the Network Appliance (NetAPP) environment, a single thirty Gigabyte file can be managed.

The images are non-virtualized and run native on physical hardware, thereby eliminating a requirement for a virtualization layer. In FIG. 7, the images are stored on NetAPPs and use SAN technology. An application is provided for scheduling, mapping/unmapping, booting, shutting down of blades as well as the overall management of the system. The application can handle both user and administration needs. The user side of the application allows the user to book a server with an image to start with. The user can shutdown the server and change images or save off a working image and power it back on. The administrative side provides information with respect to the activities going on, boot, power off, shutdown, map images, unmap images, setup schedules, modify schedules, and perform net app commands.

Architecturally, the system of FIG. 7 includes:
1. A client agent that runs on each image (e.g., image 1 306) supported by the system.
2. A server 302 that manages information from each agent and handles the workflow.
3. A web application that is the user interface to the system (e.g., a web application that runs on server 302).

A thirty GB "base" image is created that contains just the OS, and this image is saved as a basis to build all other images. This OS image has a software agent already installed, wherein the software agent is a monitoring component, that also patches the server with any new patches during boot (a feature that can administratively be turned off as needed), and handles network registration. The NetBIOS in the Windows operating system can be turned off so that multiple copies of the image can be booted without network collision of the hostname. To create a new image, a copy of this image is loaded on a machine and the pertinent software is installed/configured. This image is then saved away for use within the system so users can use this image on demand as needed. Administratively, an image can be directly mapped to a blade for an update-in-place mechanism (to add hotfixes for example). To use one of these images, a user would connect to the web application and choose an image from a selection. The cloning functionality of the Network Appliance can be used to create working images in order to allocate images on the fly.

When a reservation is activated, the system makes a "copy-on-write" copy of the specified image. This means that a copy is created (that will only contain the changes) as a mountable entity. The system attaches this mountable copy to the specific blade. The system then powers on the blade, which boots as normal.

Through the system's administration interface, the actual gold image (and not a copy) could be assigned to a server and booted. This feature aids in gold image maintenance. While a server is being used, it is running an active image. The system allows users to save or hold the currently loaded active image and select another image to load. The new image would become the active image and the other image becomes inactive. When a reservation terminates, the active image become inactive. A new reservation could use an inactive image, a user saved image, or select from a list of original/gold images. Active images are made inactive by such steps as: shutdown and power off of a blade; making an image inactive; loading a new image; and powering on.

The system allows users to save their (active or inactive) image. The system has controls to restrict the number of image saves per user and has throttling functionality so a controlled number of saves will execute at one time. This removes issues with image saves overloading the disk infrastructure.

More specifically with reference to FIG. 7, the following operational scenario can occur. From a web application, a user can select either a gold image or a personal image and request a scheduled timeframe. A daemon process locates the image on NetAPP. Images are stored as individual Logical Units (LUNs). The daemon process locates/determines an appropriate physical machine (e.g., a blade server) that is available. The daemon process uses LUN NetAPP cloning and mapping process to map LUN with an appropriate image to the assigned blade and commands the IBM chassis to boot an assigned blade from the Network Appliance LUN. The daemon process sets up the necessary accounts on the assigned machine and emails the access instructions to the user. The user lease then begins. The user works with the leased environment either from a company's internal network or an external customer site via the Internet. When the user is finished, the image can be either saved to personal space or storage of the image can be discarded. The daemon process shuts down the machine and marks it as available for future schedules.

For a training operational scenario, the system of FIG. 7 can provide the ability to reserve blocks of servers in one reservation. So a trainer that has twenty students can create twenty student machines via one reservation. The twenty servers can be administered through the system as one unit and can include in this example such functionality as:

An administrative interface that can view and manage by servers, or by user.

An activity log where all system events are written.

Image definitions which describe the software that is installed on each image. The system maintains image use count high water marks that can be used for software licensing compliance.

Degrees of access controlled through Active Directory groups. There is a User, Support, and Administration access.

Control user access on an image basis.

The system has a RUN AS USER command to help support staff act as the user in the system.

The system allows users to view their reserved servers, reservations, and saved images.

Each image that the system maintains has installed an agent. The system's agent is a monitoring component, that also patches the server with any new patches during boot, and handles network registration.

The system has a use-on-demand feature where the user requests an image for use right now. An available server is assigned and image copy created. When the user logs off, or a configurable amount of inactivity, the image is made inactive and the server is re-added to the available server list.

Figure 8:
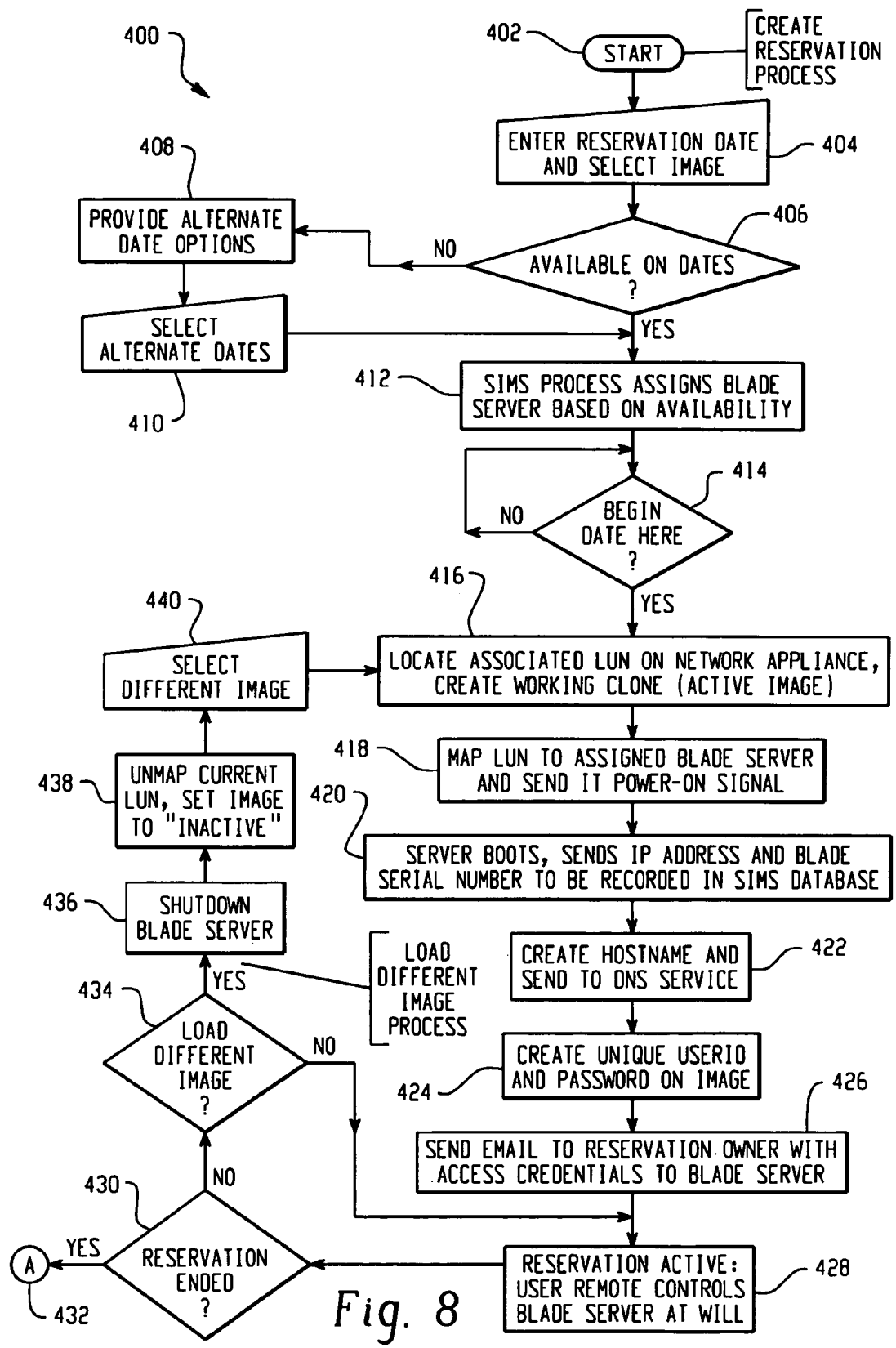
FIGS. 8-10 are flowcharts that depict an operational scenario for handling images.
Figure 9:
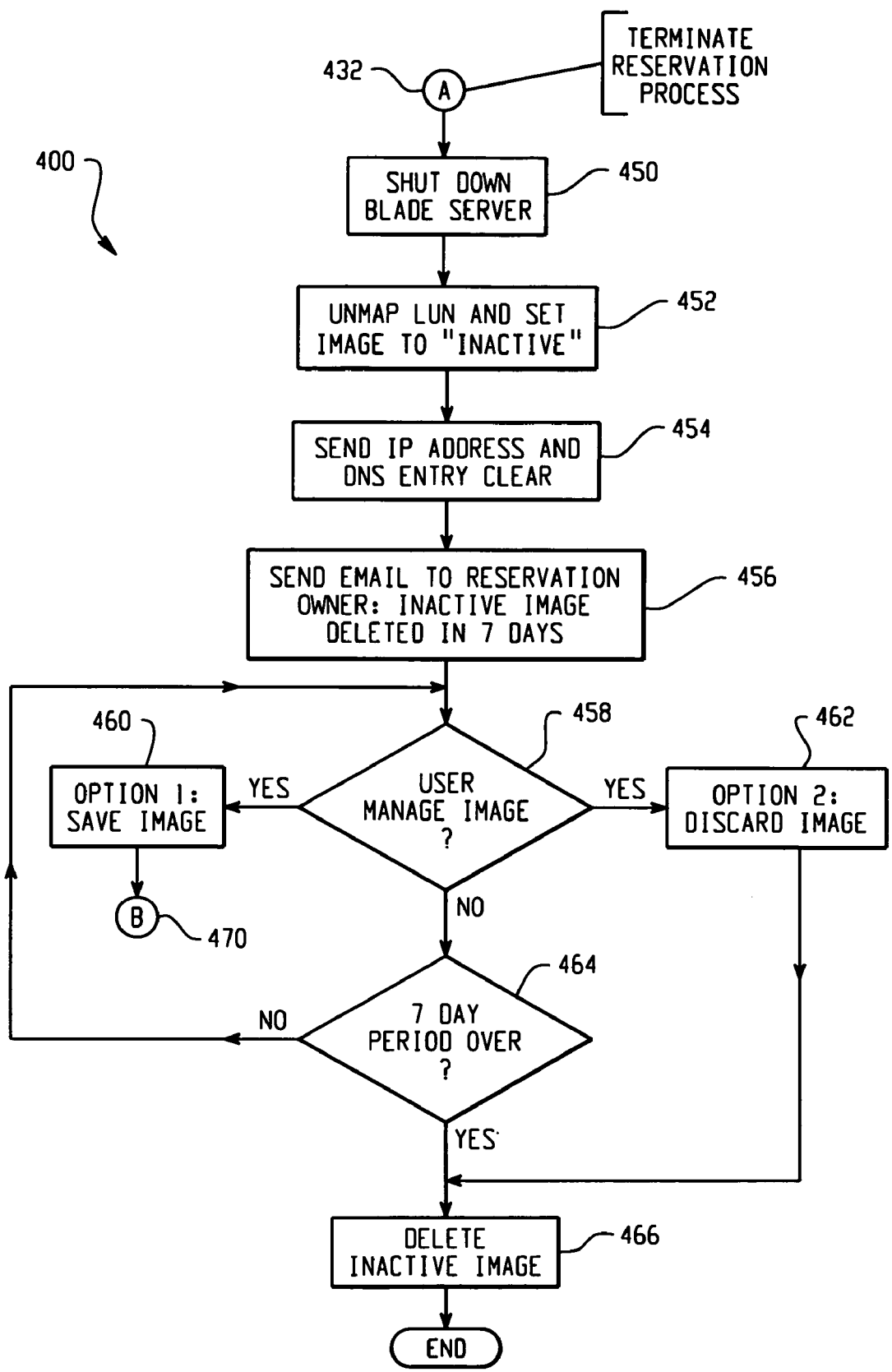
Figure 10:
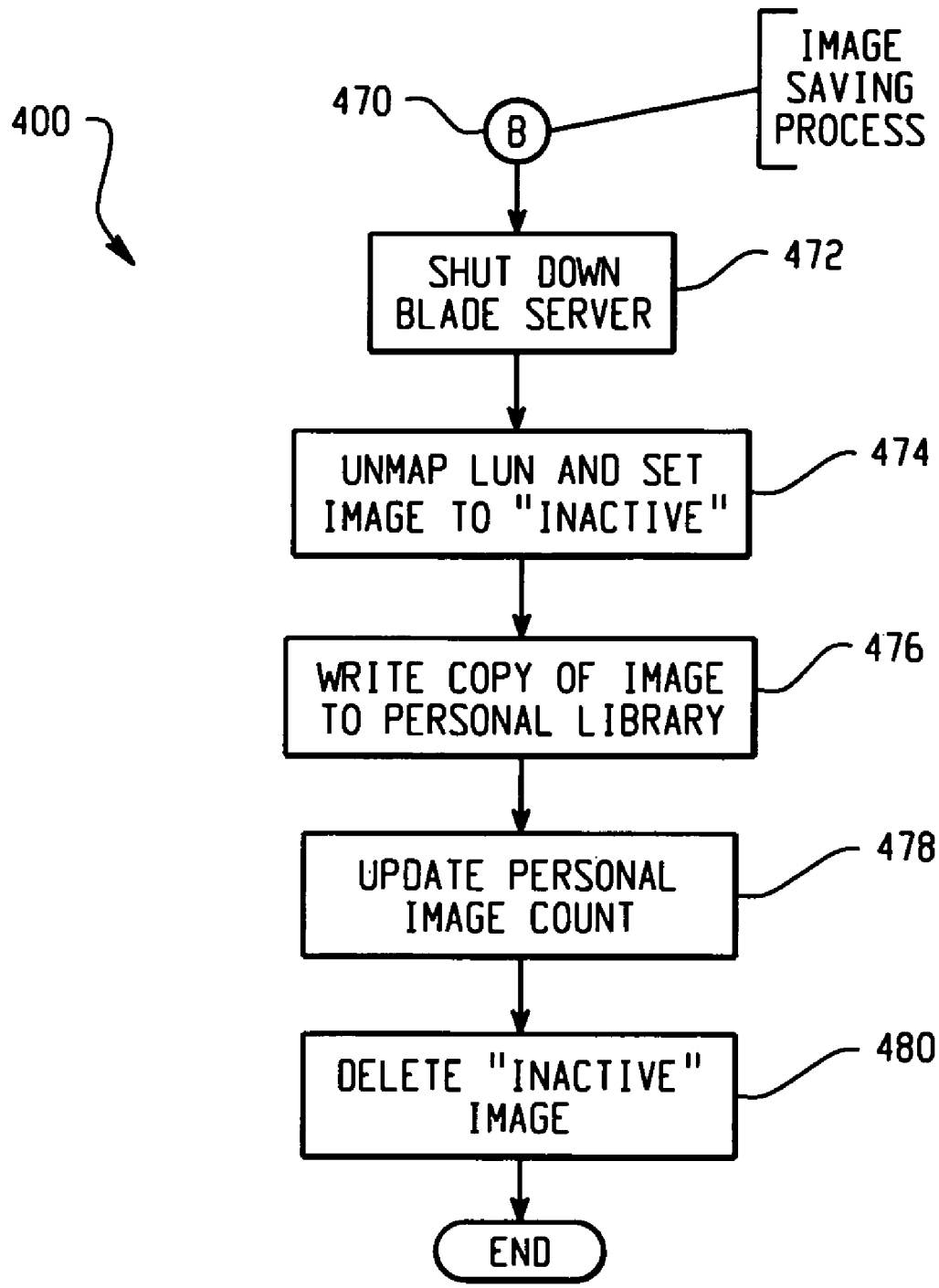

FIGS. 8-10 depict at 400 an operational scenario for a system to access software applications and their attendant image: The reservation creation process in this scenario starts at block 402.

Figure 11:
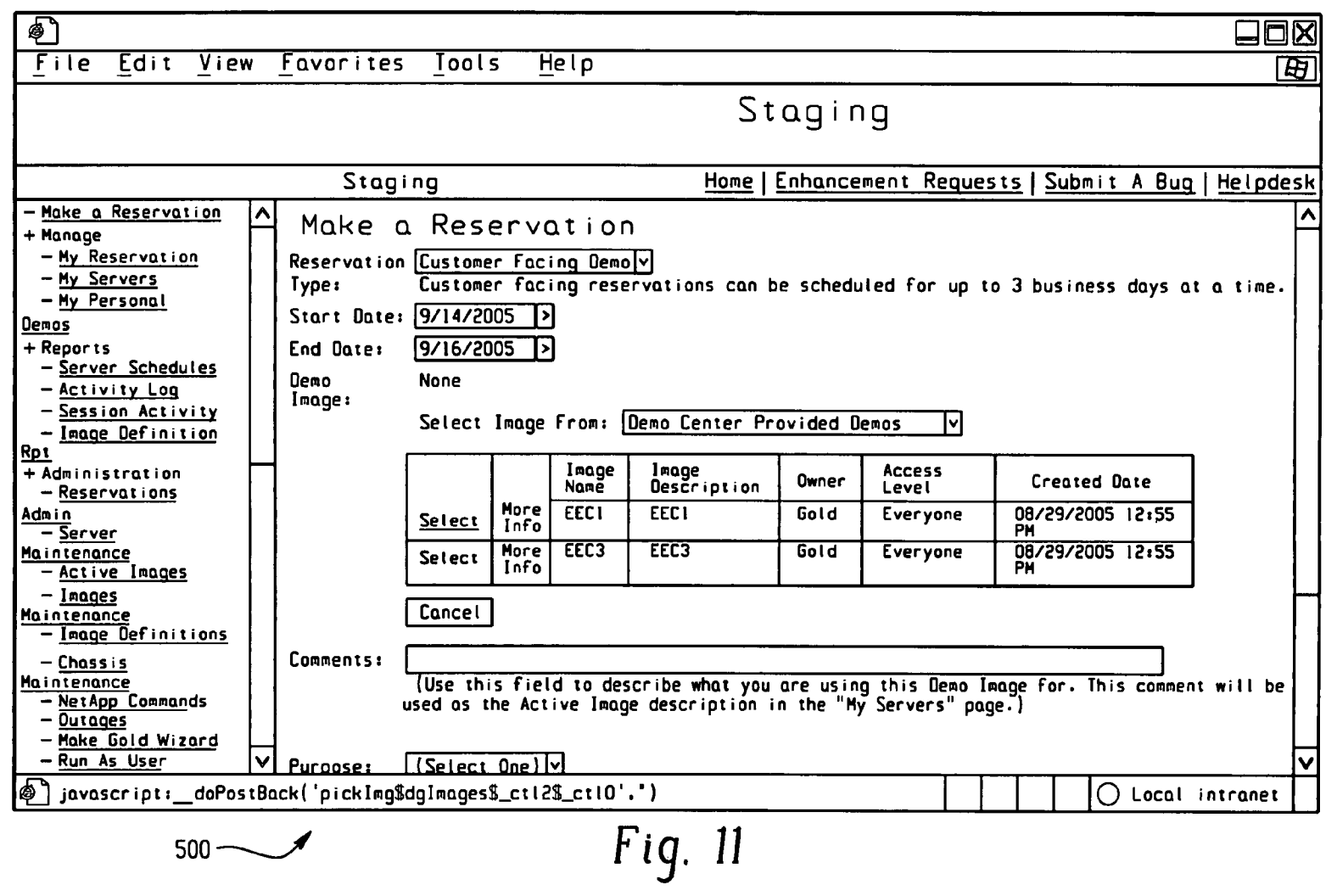

A reservation start and end date are entered at block 404 on the "Make a Reservation" web page (see, e.g., the web page shown at 500 on FIG. 11). Also the user picks an image they would like to reserve from a list of public and personal images stored on a NetAPP.

For the given image, the system checks to see which servers qualify. Images and servers have a "Server Type" associated with them so certain images can be limited to certain servers. From this list of servers, the system checks at decision block 406 which ones do not have a reservation for the given date range.

If no servers are available, then the system presents at block 408 the user with a table of servers showing where they are busy and highlight areas that are open and allow the user to select an alternate date range. The available alternatives will show options with the exact number of days but different dates shown in one color or options that are shorter in a different color. The user can enter at block 410 a new date range manually or pick from the table generated at block 408.

If a server is available, it is assigned at block 412 to that reservation and saved with the reservation record. At this point, a windows service is monitoring at decision block 414 the reservation table in order to determine whether any reservations are about to start. If a scheduled reservation is about to start, then this operational scenario proceeds to step 416.

For the image that was scheduled, a clone is created at block 416 into a qtree on the NetAPP. The first step is to create the qtree. This is done by running a remote shell command on the NetAPP (rsh) and giving it the following command: "qtree create/vol/vol1/userid". Next, the clone is created into this qtree: "lun create-b/vol/vol1/.snapshot/prod.snap.1/gold/eec1-o noreserve/vol/vol1/userid/eec1_1". In this code example: the images are all on vol1; the scheduled image is stored in the "gold" qtree; prod.snap.1 is the current snapshot on the NetAPP (the windows service keeps track of the snapshots and only creates a new one if the image being cloned is newer than the current snapshot); eec1 is the name of the LUN being cloned; userid is the user id of the person scheduling a blade; and eec1_1 is the name of the new clone ("_1" is a sequence number added to the clone to keep the clone names unique).

At block 418, the cloned image is mapped to the server. Servers are defined with igroups on the NetAPP that refer to the HBA addresses in each server. Using RSH, the following command is run in order to map the image to the server: "lun map/vol/vol1/userid/eec1_1 demo0101 0".

At block 420, the server is powered on. In order to do this, the IBM Blade management console (that resides on each Blade Chassis) is telnetted to and the following command is submitted: "power-on-T system:blade[1]". This instructs blade 1 in this chassis to power on. The system powers on, sees the mapped image on the SAN and begins booting. Once the server boots, a local windows service on the image starts up and gathers the serial number and IP Address using a WMI query. It then opens a connection back to the parent windows service and sends this information (via TCP/IP sockets). The serial number uniquely identifies the server, and its IP information is updated into the machines table. The server's status is also recorded at this point.

Because in this operational scenario servers get their IP addresses from DHCP, they can change from time to time so a new DNS entry is created for this server at block 422. This can be done with an external utility called nsupdate that is passed a script to create the DNS entry.

Next, the service will communicate back to the local service on the running image and tell it to create a local user id and password at block 424 for the user to use to log into their blade.

Email is sent at block 426 to the user via SMTP. The user id is used against Active Directory to determine the email address. This email will tell the user that their server is ready, how to access it, the reservation details, and where to get help if they have a problem.

At this point the reservation is active and the user can use Remote Desktop to login to their server as indicated at block 428.

If the reservation has not ended as examined at decision block 430, then processing continues at decision block 434. If the user decides at decision block 434 to run a different image on their server, then the user will initiate the server to be shutdown which can be done via the web site or doing a Start to Shutdown operation within the Remote Desktop connection. It will open a socket connection to the local service running on the image and tell it to shut down at block 436 using the Windows API call, InitiateSystemShutdownEx. Upon windows shutting down, the local service will notify the parent service that it is shutting down which in turn sets the server status to "Shutting Down". The parent service will then monitor the blade power status until it is "Off" by telneting into the blade chassis management console and running the following command to determine the power status: "powerstate-T system:blade[1]". This returns "On" or "Off". When the server is off, the status is updated on the server to let the user know that their server is really Off.

From the web site, the user can now pick a different image. Upon making their selection, this will cause at block 438 the existing image that is mapped to be unmapped. The parent windows service will submit the following command via RSH to the NetAPP to unmap the image: "lun unmap/vol/vol1/userid/eec1_1 demo0101".

A different image is selected at block 440 and blocks 416 and 418 are run to create a new clone and map it to the server. The user then can trigger the server to boot again from the web site. Blocks 420, 422, and 424 are executed for the booting process. No email is sent to the user during this process.

If the reservation ends (or is terminated by the user) as determined at decision block 430, then processing continues on FIG. 9 as indicated by continuation indicator 432 wherein the parent windows service will execute the steps shown in FIG. 9. With reference to FIG. 9, the server is shut down at block 450 which is the same process described in block 436.

Once the server is Off, then the image is unmapped and left inactive at block 452. This is done by submitting the following command via RSH to the NetAPP: "lun unmap/vol/vol1/userid/eec1_1 demo0101".

At block 454, the DNS entry is cleaned up by running the nsupdate command and giving it a script to remove the DNS entry created during the reservation startup.

Email is sent at block 456 to the user telling them their reservation has ended and that they have seven days to save their inactive image.

If the user decides at decision block 458 to save their image (e.g., elect option 460), the operational scenario continues at block 472 on FIG. 10 as indicated by continuation indicator 470.

If the user decides at decision block 458 to delete the inactive image, then the parent windows service pursues the discard image option 462 and deletes at block 466 the inactive image by submitting the following via RSH to the NetAPP: "lun destroy/vol/vol1/userid/eec1_1".

If the user takes no action as determined at decision block 464, then after seven days the inactive image is automatically deleted at block 466.

With reference to FIG. 10, when an image is saved, the following will happen. If the server is on, the user will shut it down at block 472 by either shutting it down from within Remote Desktop or by using the system to trigger it to shut down (see block 436 for commands).

Upon saving, the image is unmapped at block 474 from the server (if not already done so from previous activities; see block 452 for commands).

The clone is saved at block 476 by submitting the following command via RSH to the NetAPP: "lun clone split start/vol/vol1/userid/eec1_1". This may take several minutes as a new thirty Gigabyte lun is created on the NetAPP. The parent windows service monitors the status of the saving process by issuing: "lun clone split status/vol/vol1/userid/eec1_1" commands to the NetAPP to determine if the save has completed.

Once it has completed, the image is moved to another NetAPP qtree where the user keeps their permanent personal images. First the qtree is checked to ensure it exists. If not, it is created with the following NetAPP command: "qtree create/vol/vol1/p_userid". The "p_" indicates that this is the permanent location for personal images.

The users quota is incremented at block 478. Users cannot exceed their quota of personal images. The inactive image is deleted at block 480.

It should be understood that similar to the other processing flows described herein, the steps and the order of the steps in the flowchart described herein may be altered, modified and/or augmented and still achieve the desired outcome.

While examples have been used to disclose the invention, including the best mode, and also to enable any person skilled in the art to make and use the invention, the patentable scope of the invention is defined by claims, and may include other examples that occur to those skilled in the art.

For example, systems and methods can be configured in many different ways to handle management of images and schedules, and can have levels of authorization so that various levels of control can be dispersed/distributed within the support organization as needed. As an illustration, a user can go to a web page and select an image that has the software they require, select a start and end date, and the system handles the workflow and process details to make the selected image available to a user for their selected timeframes. The user can follow the process via email. The system loads the image, creates a userid, and notifies the user via email the image name, IP address, generated userid and password so the user can begin using the machine.

A system can be configured to use physical hardware to manage and run images eliminating the need for a virtualization layer and its attendant performance and other issues. Such a system can create a fast, easy, consistent, reproducible process to demonstrate, train, and test software products on a central server environment from remote locations around the world. The system can run on native physical hardware, use existing support models, and users can now focus on SAS paying customers rather than installing and configuring software. Moreover, the system allows the demonstration of enterprise-class software on servers over the Internet on a laptop that would otherwise cause customers to focus on questions about laptop performance than on the software itself. Questions might come from customers about laptop performance because software personnel would be demonstrating to customers sophisticated software products on laptops instead of running the software over the Internet on a server; the diminished processing capability of the laptop would make customers focus more on the slowness of the demonstration of the software on the laptop rather than on the features of the sophisticated software being demonstrated. This more efficient system can be used by sales, marketing, training, and education personnel. However any business or personal computing area that has a need to work with software could benefit.

Figure 12:
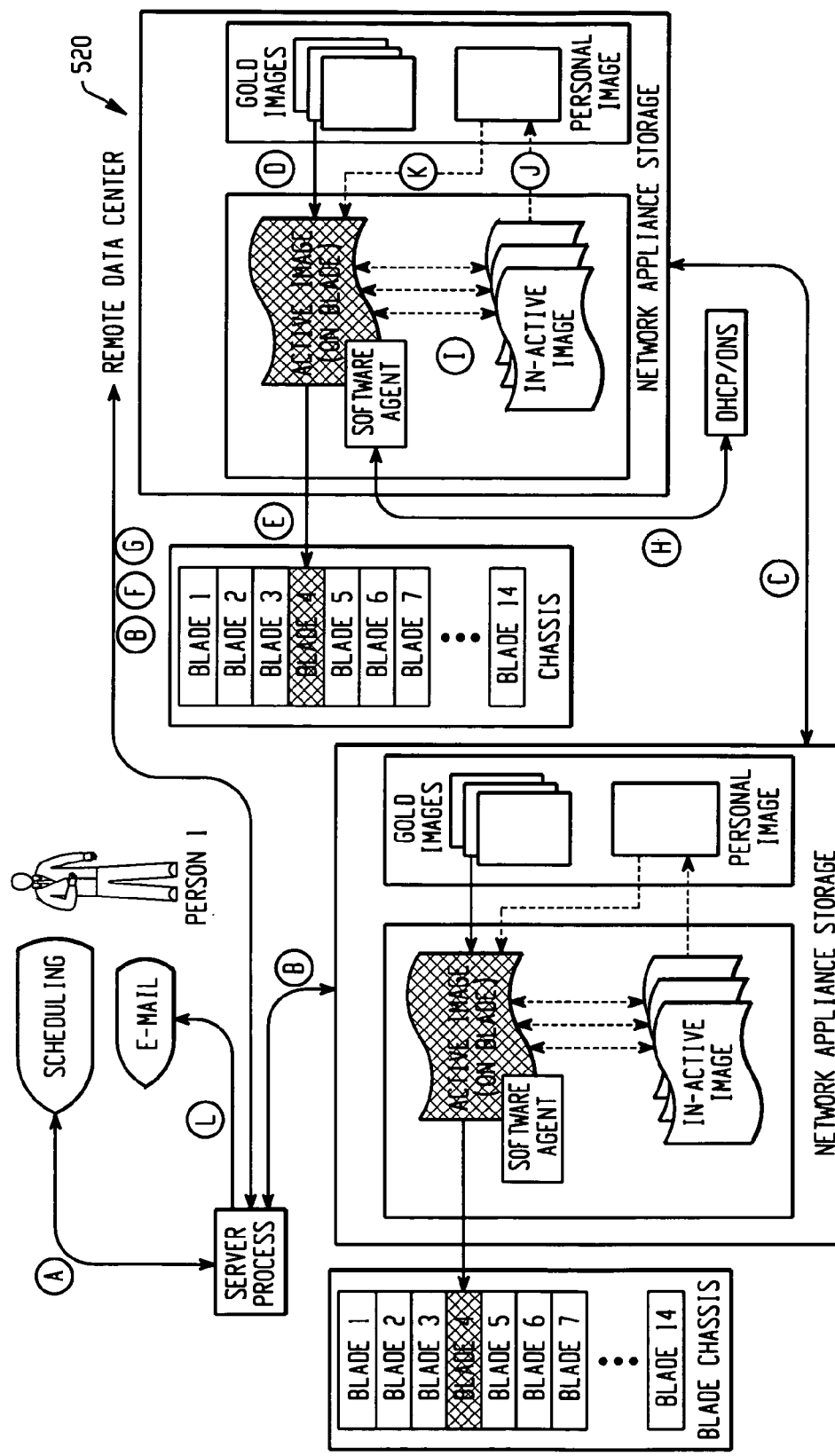
FIG. 12 is process flow diagram depicting an operational scenario for handling images.

It is further noted that the systems and methods may be implemented on various types of computer architectures, such as for example on a single general purpose computer or workstation, or on a networked system, or in a client-server configuration, or in an application service provider configuration. For example, with reference to FIG. 12, a server process can support control of data server (e.g., data center 510) and/or remote infrastructure (e.g., remote data center 520). Remote infrastructures could be installed at worldwide regional areas (for example an installation can be placed in the United States, Europe, Asia,.etc.) to counter the physics of network delay and latency that arise from using a centralized resource. A system can be configured such that remote infrastructures could still be under control of a global server process. This may give regional users faster user interface performance while maintaining the control and reduced support costs of a centralized application.

A remote data center 520 could be configured to operate independent of other data centers (e.g., 510) or could be configured to communicate with one or more (centralized and/or remote) data centers (e.g., data center 510). As an illustration, a remote data center 520 can communicate over the Internet with the data center 510 to retrieve a gold image from the data center 510 for use within the remote data center 520, such as to be used as an active image within the remote data center 520. As another non-limiting illustration, the data center 510 can communicate with the remote data center 520 to retrieve a gold image from the remote data center 520 for use within the data center 510, such as to be used as an active image within the data center 510. The communications can be over one or more types of networks, such as over wireless networks, wired networks, or combinations thereof.

A remote data center 520 can be used in many different ways based upon the approaches disclosed herein. As an illustration, a user can schedule at step A a reservation for a server with a particular image to be loaded. At step B, when the reservation comes due, the system starts the reservation by first communicating with the NetAPPs on the remote and local data centers 510 and 520 to determine the location of the desired image. If the image is not already at the remote data center where the user will be accessing their assigned blade, then at step C, that gold image is copied to the storage at the remote data center 520, otherwise, the process skips to step D. At step D, an active working image (e.g., a clone) is created from an original image that the user picked in his/her reservation. At step E, the image at the remote data center 520 is mapped to the server of the remote data center and powered on. Upon booting, a software agent at step F within the image begins executing and communicates back that the server has booted and registers its IP address in a database. At step G, user accounts are created on the image. At step H, the server process then creates a DNS name for the IP address so that a user can use a name instead of an IP Address to access the server. At step L, the user is sent email instructing them that their server is ready. It also provides the userid and password along with the IP Address and DNS name.

At step I, if the user ends the reservation or unloads an image, the active working image becomes an inactive image (i.e., not mapped to a server). At step J, the inactive image can be saved to a personal image (i.e., becomes another "original" image). At step K, the user is allowed to reload this image or use it in future reservations. When this happens a new "Active" image is created from the personal image.

As another example of the wide scope of the systems and methods disclosed herein, data signals can be used to convey data via networks (e.g., local area network, wide area network, internet, etc.), fiber optic medium, carrier waves, wireless networks, etc. for communication among multiple computers or computing devices. Data signal(s) can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A computer-implemented system, comprising:
   one or more processors;
   one or more computer-readable storage mediums containing software instructions executable on the one or more processors to cause the one or more processors to perform operations including:
   receiving a request to execute a software application having an original image, wherein the original image includes a list of one or more pointers to data blocks used to generate the original image;
   receiving new data corresponding to one or more changes to the original image;
   generating a delta image, wherein the delta image includes a list of one or more pointers to data blocks used to generate the original image, and wherein the delta image includes at least one data block containing new data received after the original image was generated;
   mapping the delta image pointers to a computer hardware unit; and
   accessing the delta image using the delta image pointers, wherein the delta image is non-virtualized, and wherein the delta image is run on the computer hardware unit.

2. The system of claim 1, wherein the original image includes an operating system, terminal services, and client software.

3. The system of claim 2, wherein the original image includes software infrastructure components.

4. The system of claim 1, wherein the original image is a permanent image.

5. The system of claim 1, wherein the delta image pointers consume little or no space on the computer hardware unit.

6. The system of claim 1, wherein the computer hardware unit is a server.

7. The system of claim 6, wherein the server does not contain system drives.

8. The system of claim 1, wherein the original image is a complete and permanent image, wherein the original image includes an operating system and software applications; and wherein the delta image pointers operate as a working image.

9. The system of claim 8, wherein when a server is booted, the server is configured to use its associated delta image as the drive, and wherein the server boots as if there is a local hard drive within the server.

10. The system of claim 8, wherein the delta images are stored on a data storage unit.

11. The system of claim 1, wherein size of an original image is greater than one gigabyte.

12. The system of claim 1, further comprising:
    an interface for selecting a software application to be executed, wherein the interface is configured to allow a date and time to be specified for when an original image is used.

13. The system of claim 12, wherein the computer hardware unit includes a server, and wherein the interface is configured to allow the selection of an original image, the scheduling of a server lease, and the management of images that run on that server.

14. The system of claim 13, wherein the interface is configured to allow the original image to be put on hold while another image is selected to run on the server, and wherein customized images can be saved to an image library.

15. The system of claim 13, wherein the system is configured to run an original image with minimal setup or configuration time.

16. The system of claim 13, wherein the interface is configured to allow the server to be scheduled with an image when the scheduled time occurs, and wherein an image represents the "C:" and "D:" drive of a server and contains an operating system and application software pre-installed.

17. The system of claim 16, wherein the interface is configured to allow any image to be mapped to any server.

18. The system of claim 1, wherein an original image includes an application Demo, training, or testing image.

19. The system of claim 1, wherein the software application is used to demonstrate, manage, train, or test software products.

20. The system of claim 1, wherein mapping includes associating the computer hardware unit with one delta image at a time.

21. The system of claim 1, wherein mapping is done on a local server, and wherein a remote data center contains the computer hardware unit.

22. The system of claim 1, wherein the local server communicates with the remote data center using one or more networks.

23. A computer-implemented method, comprising:
   receiving, using one or more processors, a request to execute a software application having an original image, wherein the original image includes a list of one or more pointers to data blocks used to generate the original image;
   receiving new data corresponding to one or more changes to the original image;
   generating a delta image, wherein the delta image includes a list of one or more pointers to data blocks used to generate the original image, and wherein the delta image includes at least one data block containing new data received after the original image was generated;
   mapping the delta image pointers to a computer hardware unit; and
   accessing the delta image using the delta image pointers, wherein the delta image is non-virtualized, and wherein the delta image is run on the computer hardware unit.

24. A computer-readable storage medium encoded with instructions that when executed on one or more processors within a computer system perform a method, comprising:
   receiving a request to execute a software application having an original image, wherein the original image includes a list of one or more pointers to data blocks used to generate the original image;
   receiving new data corresponding to one or more changes to the original image;
   generating a delta image, wherein the delta image includes a list of one or more pointers to data blocks used to generate the original image, and wherein the delta image includes at least one data block containing new data received after the original image was generated;
   mapping the delta image pointers to a computer hardware unit; and
   accessing the delta image using the delta image pointers, wherein the delta image is non-virtualized, and wherein the delta image is run on the computer hardware unit.

* * * * *